UNITED STATES PATENT OFFICE.

FRANZ FLAECHER, OF HÖCHST-ON-THE-MAIN, GERMANY, ASSIGNOR TO H. A. METZ & CO., OF NEW YORK, N. Y., A CORPORATION OF NEW YORK.

SALT OF THE OPTICALLY-ACTIVE LAEVO-O-DIOXYPHENYLETHANOLMETHYLAMIN.

986,156. Specification of Letters Patent. Patented Mar. 7, 1911.

No Drawing. Application filed September 29, 1909. Serial No. 520,127. (Specimens.)

*To all whom it may concern:*

Be it known that I, FRANZ FLAECHER, a subject of the Emperor of Germany, residing at Höchst-on-the-Main, Germany, have invented certain new and useful Improvements in the Preparation of a Salt of the Optically-Active Laevo-O-Dioxyphenylethanolmethylamin, of which the following is a full, clear, and exact specification.

My invention relates to certain new and useful improvements in the method of preparing a salt of the optically active l-o-dioxyphenylethanolmethylamin, and in the said product itself. Such a salt has not hitherto been obtainable in spite of the numerous efforts made to produce it and it is of extreme importance, for so far as I am aware, it is only with its assistance that it becomes possible to prepare the l-o-dioxyphenylethanolmethylamin in such perfect purity as is required of a substance of such extraordinary pharmacological efficiency, and at the same time one so readily oxidized. The treatment of the crude base gains in this way not only in simplicity, but in reliability as well, and the pure crystallized bi-tartrate of the optically active l-o-dioxyphenylethanolmethylamin represents a compound of extreme stability, the base linked to the acid being much less susceptible to oxidation than the free compound. I have found that a well crystallized salt of the l-o-dioxyphenylethanolmethylamin can be prepared by causing this base to react with tartaric acid, excluding water as completely as possible. Whereas, for instance, it is not possible to obtain crystals from a water solution of l-o-dioxyphenylethanolmethylamin in tartaric acid, even under extensive evaporation of the solution the bi-tartrate is promptly crystallized in well shaped crystals from a solution of one molecular equivalent of l-o-dioxyphenylethanolmethylamin in one molecular equivalent of alcoholic tartaric acid. Working with a methyl-alcoholic solution will be found to be especially advantageous for the preparation of the salt. For producing this crystallized bi-tartrate of the optically active ortho-dioxyphenylethanolmethylamin, the optically inactive base described in United States Patent Number 930,703 may be used as a parent product. One molecular equivalent of the latter is moistened with an equal quantity of absolute methyl-alcohol, and dissolved in a solution, heated to about fifty degrees, of one molecular equivalent of the commercial dextro-tartaric acid in three to four times its quantity of methyl-alcohol. When the mass becomes cold the bi-tartrate of the l-o-dioxyphenylethanolmethylamin isolates itself in coarse crystals, while the bi-tartrate of the dextro-ortho-dioxyphenylethanolmethylamin remains dissolved. The isolated salt is filtered off, washed with methyl-alcohol and recrystallized from methyl-alcohol of ninety-five per cent. strength, or from alcohol of ninety per cent. strength, until it shows the melting point of one hundred and forty-nine degrees C.

The chemical reaction, which preferably occurs at a temperature of about fifty degrees C. is as follows:

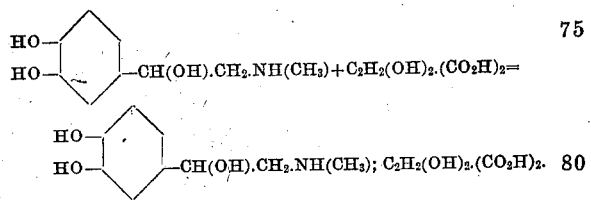

The l-o-dioxyphenylethanolmethylamin bi-tartrate melts at approximately 149 degrees C.; its water solution also rotates the ray of polarized light to the left amounting to about 13 degrees, $[\alpha]D = -13$ degrees. It also possesses the hemostatic and blood-pressure raising properties of the suprarenal gland.

Some variations of the foregoing method may be found to be satisfactory in the production of my product and I do not mean to limit myself specifically to the exact steps outlined, but

What I claim and desire to secure by Letters Patent is:

1. The method of preparing a crystallized stable salt of the optically active l-ortho-dioxyphenylethanolmethylamin, consisting in causing one molecular equivalent of the base to react with one molecular equivalent of tartaric acid excluding water as completely as possible.

2. The method of preparing a crystallized stable salt of the optically active l-ortho-dioxyphenylethanolmethylamin, consisting in causing one molecular equivalent of the base to react in an alcoholic solution with one molecular equivalent of tartaric acid excluding water as completely as possible.

3. As a new product, a stable crystallized acid salt of the laevo-rotatory ortho-dioxyphenylethanolmethylamin with tartaric acid, consisting of a white crystalline powder which is readily soluble in water, difficultly soluble in alcohol, melting at 149 degrees C. and possessing the hemostatic and blood-pressure-raising properties of the suprarenal gland.

In testimony whereof I have hereunto set my hand in the presence of two subscribing witnesses.

FRANZ FLAECHER.

Witnesses:
  JEAN GRUND,
  CARL GRUND.